United States Patent
Dionne et al.

(10) Patent No.: US 7,462,271 B2
(45) Date of Patent: Dec. 9, 2008

(54) STABILIZERS FOR TITANIUM DIBORIDE-CONTAINING CATHODE STRUCTURES

(75) Inventors: Martin Dionne, Varennea (CA); Jules Bergeron, Jonquiére (CA); Amir A. Mirchi, Jonquiére (CA)

(73) Assignee: Alcan International Limited, Montreal (CA)

(*) Notice: Subject to any disclaimer, the term of this patent is extended or adjusted under 35 U.S.C. 154(b) by 325 days.

(21) Appl. No.: 10/723,966

(22) Filed: Nov. 26, 2003

(65) Prior Publication Data

US 2005/0109615 A1 May 26, 2005

(51) Int. Cl.
    C25B 11/12 (2006.01)
(52) U.S. Cl. ............ 205/386; 204/294; 252/506; 252/507; 264/29.1; 264/105
(58) Field of Classification Search ........... 204/294; 264/614, 29.1, 105; 205/386; 252/506, 507
    See application file for complete search history.

(56) References Cited

U.S. PATENT DOCUMENTS

| 4,486,544 A | 12/1984 | De Pous et al. ............ 501/96 |
| 4,492,670 A * | 1/1985 | Mizrah et al. ............... 419/9 |
| 5,227,045 A * | 7/1993 | Townsend .................. 205/230 |
| 5,527,442 A | 6/1996 | Sekhar et al. ............ 204/243 R |
| 6,312,570 B1 | 11/2001 | Mroz ....................... 204/247.3 |
| 6,616,829 B2 | 9/2003 | Keller et al. ................. 205/386 |

FOREIGN PATENT DOCUMENTS

| CA | A1 2305581 | 4/1999 |
| CA | A1 2350814 | 5/2000 |
| EP | B1 0 577 116 | 1/1998 |
| WO | A1 WO 91/18845 | 12/1991 |
| WO | WO 95/13407 | 5/1995 |
| WO | A1 WO 00/29644 | 5/2000 |

OTHER PUBLICATIONS

Supplementary European Search Report, European Patent Office, Jun. 1, 2007, in application No. EP 04 80 2188.

* cited by examiner

*Primary Examiner*—Susy N Tsang-Foster
*Assistant Examiner*—William T Leader
(74) *Attorney, Agent, or Firm*—Cooper & Dunham LLP

(57) ABSTRACT

A method is described for making aluminum reduction cell components, e.g. cathodes having stabilized surfaces, which comprises mixing together a carbonaceous material, $TiB_2$ and up to 25% by weight of a finely divided additive consisting of a combination of two intimately mixed compounds and forming the mixture into a cell component, wherein at least a first of the two compounds has a higher melting temperature than the baking temperature. When the cell component is contacted with molten aluminum, the aluminum reacts with the additive to form a dense phase at the surface of the cell component, having low solubility in aluminum.

7 Claims, 2 Drawing Sheets

STABILIZERS FOR TITANIUM DIBORIDE-CONTAINING CATHODE STRUCTURES

FIELD OF THE INVENTION

The invention generally relates to stabilizing additives for titanium diboride-containing carbonaceous cell components for metal reduction cells, e.g. cell cathodes and processes for their preparation.

BACKGROUND OF THE INVENTION

Metal reduction cells, such as those used for producing aluminum, typically utilize carbonaceous cathodes. The cathode can be in the form of a layer formed on the inside of the reduction cell, for example, as an array of a cathode blocks joined by ramming paste. However, over time, electrolyte in the cell and the molten metal tend to attack the carbon-based cathode, causing it to erode. The erosion is further enhanced by movements in the cell due to magneto-hydrodynamic effects. Similar erosion also occurs to the ramming pastes used to seal cracks and joints in the cell.

It has been known for a number of years that cathodes can be made from a composite of a carbon-containing component and a metal boride, such as titanium diboride ($TiB_2$). The $TiB_2$ helps to protect the cathode against erosion and oxidation and makes the cathode wettable to aluminum. The wettability is an important characteristic particularly in drained cathode cells.

Attempts have been made to apply refractory coatings made of metal borides, such as titanium boride ($TiB_2$), to a cathode to protect it from erosion. An example of such coating is described in WO 01/61077, in which the coating was made from a refractory slurry of titanium boride dispersed in an aluminum oxalate complex. However, differences in thermal expansion between the coating and the cathode often cause the coatings to crack or dislodge from the cathode.

Another solution to cathode erosion is described in WO 00/36187 where composite cathodes blocks are formed, in which metal boride layers are bonded to a carbonaceous substrate to form a multi-layer cathode block. The carbonaceous substrate is given a roughened surface so that the metal boride layer may better bond to the carbonaceous substrate.

Since metal borides used in making cathode blocks are very expensive, another method of manufacturing the blocks is to mix metal boride precursors of, for example, metal oxides and boron oxides, with the carbonaceous substrate to produce a composite material that forms metal boride in situ when exposed to molten aluminum in the cell, or when it is exposed to the heat of the cell at start-up and during operation. An example of such a process is described in WO 00/29644.

Although use of cathode blocks containing metal borides in reduction cells reduces the extent of cathode erosions, lab and factory experiments show that metal boride particles gradually leach out of the cathodes and enter a film of liquid aluminum present on the surface of the cathode. In industrial use, this leads to the formation of a metal boride-aluminum layer, having a thickness of approximately 3 mm, on the cathode. In the case where titanium boride is used in the cathode block the layer is a $TiB_2$—Al(l) layer. The removal of $TiB_2$ particles leads to a contamination of the metal product and to a progressive erosion of the cathode blocks, since the more metal boride that leaches out of the cathode, the more quickly the cathode erodes.

It is therefore desirable to find an inexpensive and simple way of preventing leaching of metal borides from carbonaceous composite cathode blocks, refractory coatings and ramming pastes.

It is also desirable to make erosion-resistant, aluminum wettable, cathode blocks, refractory coatings and ramming pastes which do no leach out metal borides during use.

SUMMARY OF THE INVENTION

The present invention relates to a novel additive to be included in a carbonaceous material-$TiB_2$ aggregate mixture used in the production of metal reduction cell components, such as cell cathodes. The additive comprises an intimate mixture of two finely divided compounds which is added to the aggregate. At lease one of the additive compounds has a melting point higher than both the baking temperature for the cathodes and the melting temperature of aluminum. Once the electrode has been formed and baked, the additive is generally found in a carbon matrix between the $TiB_2$ particles. During aluminum reduction, liquid aluminum wets the cathode surface and penetrates the cathode via open pores. In the pores, the liquid aluminum reacts with the additive mixture to form a dense phase that seals the open pores of the cathode and stabilizes the carbon matrix around the $TiB_2$ particles of the carbon-$TiB_2$ aggregate.

The present invention thus provides in one embodiment, a method of making an aluminum reduction cell component having a physical and chemically stable surface that comprises mixing together a carbonaceous material, $TiB_2$ and up to 25% by weight of a finely divided additive consisting of a combination of two intimately mixed compounds and forming and baking the mixture into the cell component, wherein at least a first of the two compounds has a higher melting temperature than the baking temperature. Thereby, when the cell component is contacted with molten aluminum, the aluminum reacts with the additive to form a dense phase at the surface of the cell component, having low solubility in aluminum.

The present invention, in a further embodiment, provides a baked aluminum reduction cell component having a physical and chemically stable surface and comprising carbonaceous material, $TiB_2$ and up to 25% by weight of a finely divided additive consisting of a combination of two intimately mixed compounds, positioned between particles of the $TiB_2$ and reactable with molten aluminum to form a dense phase on the surface of the cell component, said dense phase having low solubility in aluminum. At lease a first of the two compounds has a higher melting temperature than the baking temperature of the cell component.

The combination of two compounds can disperse evenly in the aggregate and can react with molten aluminum to form a dense phase on the surface of the cell components. The compounds are intimately mixed in the form of finely divided particles, such that particles of one compound come into contact with particles of the other compound. In this context, "finely divided" refers to particles typically having an average size of less than 200 µm, preferably less than 100 µm.

At least one compound of the additive mixture has a melting temperature greater than the baking temperature for the cell component, e.g. 1200° C. or higher. A second compound may have a melting temperature higher or lower than the baking temperature for the cell component. When the second compound has a lower melting temperature, during the baking stage, the lower melting compound melts around the higher melting compound to form an agglomerate.

It is also possible to use two high melting compounds, neither of which melts during the baking stage. In this case, the two compounds remain in intimate solid contact throughout the baking stage and engage the molten aluminum in the aluminum reduction cell in that form.

The high melting compound is typically a titanium compound such as TiC or $TiO_2$. However it is possible to use other high melting compounds that will react appropriately with the molten aluminum according to the invention, e.g. $Al_2O_3$ or BN. The lower melting compound is typically a boron compound, such as $B_2O_3$, boric acid, etc. Where both compounds are high melting materials, it is preferred to use the combination of a high melting titanium compound and a high melting boron compound, such as boron carbide or boron nitride.

BRIEF DESCRIPTION OF THE DRAWINGS

The present invention will be described in conjunction with the following figures.

DETAILED DESCRIPTION OF PREFERRED EMBODIMENTS OF THE INVENTION

Figure 1:
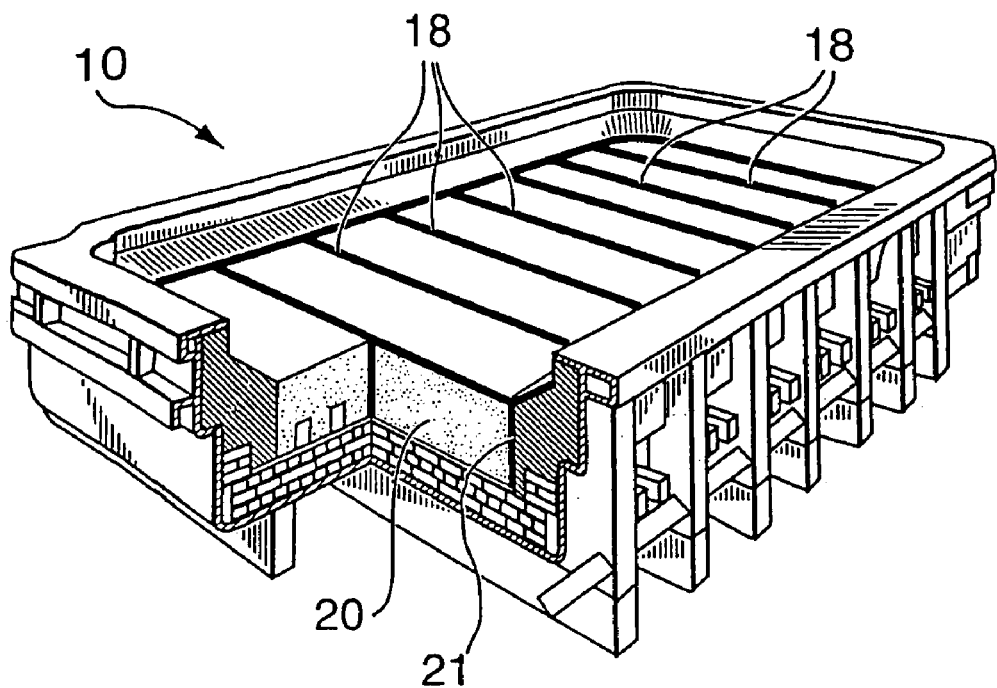
FIG. 1 is a perspective view, partially cut-away, of a conventional aluminum reduction cell with which the present invention may be used.
Figure 2:
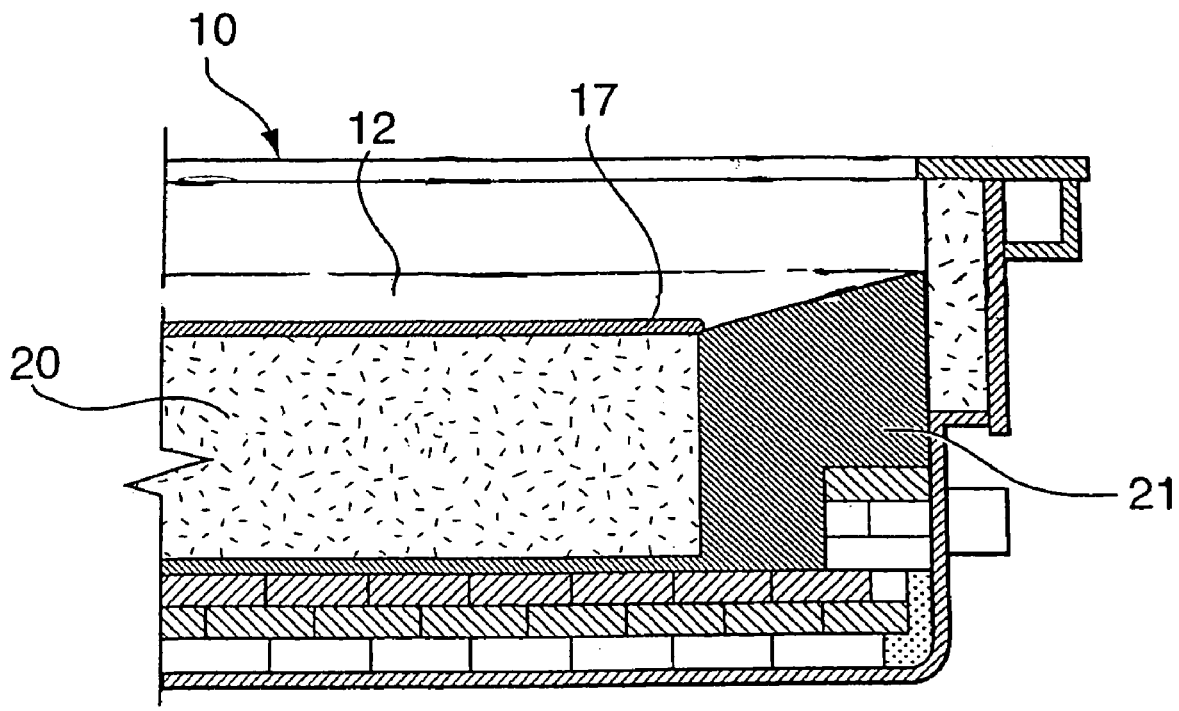
FIG. 2 is a partial transverse cross-section of the cell of FIG. 1 on an enlarged scale showing the electrolyte and molten aluminum.

With reference to FIG. 1, a conventional reduction cell 10 comprises cathode blocks 20, commonly made of a metal boride-carbon aggregate. The cathode blocks are separated by gaps 18, the gaps 18 being filled with ramming paste 21. As seen in FIG. 2, molten electrolyte 12 contacts the cathode 20 and the ramming paste 21 and a layer of molten aluminum 17 forms on the cathode 20. During operation, metal boride tends to leach out from the porous cathode block and intermingle with the layer of molten aluminum 17, causing contamination of the molten aluminum. Removal of metal boride from the cathode block also accelerates erosion of the cathode block.

It has been found that combining an additive mixture of two finely divided, intimately mixed compounds with the carbonaceous-$TiB_2$ aggregate used in making cathode blocks results in the additive reacting with molten aluminum in the reduction cell to form a dense phase at the surface of the cathode block. This dense phase reduces erosion of the cathode block.

In a preferred embodiment, the combination of two compounds of the additive mixture comprises one compound with a melting temperature higher than the cathode-baking temperature and one boron containing compound with a melting temperature lower than the cathode-baking temperature. When such a combination is intimately mixed and exposed to heat, the lower melting compound melts around the high melting compound to form an agglomerate. Suitable combinations of high melting and low melting compounds include $TiO_2$ and $B_2O_3$, TiC and $B_2O_3$, $Al_2O_3$ and $B_2O_3$, $TiO_2$ and $Na_2B_4O_7$, BN and $B_2O_3$, and an Al—C—Ti master alloy and $B_2O_3$. In these combinations, it is also possible to replace the $B_2O_3$ by $H_3BO_3$.

Other combinations of compounds suitable as the additive mixture include $TiO_2$ with BN and $TiO_2$ with $B_4C$. In such combinations, neither of the two compounds melt during the cathode-baking step, but are rather intimately mixed in their solid, powdered form.

A preferred combination comprises a titanium-containing high melting compound and $B_2O_3$ as the lower melting compound. A most preferred combination is $TiO_2$ and $B_2O_3$. Although all of the above-mentioned combinations are suitable additives, for illustrative purposes, the $TiO_2$—$B_2O_3$ combination shall be referred to in the rest of this description.

The additive mixture of $TiO_2$—$B_2O_3(s)$ can be obtained via a method as described in International Publication No. WO 00/29644, incorporated herein by reference. The $TiO_2$ and $B_2O_3$ particles of the additive mixture are preferably less than 100 microns ($\mu$m) and more preferable less than 30 $\mu$m. The oxides are mixed in an approximately stoichiometric ratio and preferably in a ratio of 40-50% by weight $TiO_2$ to 50-60% by weight $B_2O_3$. The additive mixture is preferably a finely divided powder and may be prepared at room temperature.

A fine powder of the additive mixture is added to a cathode aggregate of $TiB_2$ and carbon in an amount of preferably up to 10% by weight, e.g. 1 to 10% by weight. The aggregate generally consists of a mixture of 40-49% titanium diboride ($TiB_2$), and 50% carbonaceous component. The carbonaceous component can be any carbonaceous components known in the art of cathode manufacture, for example a mixture of anthracite and pitch. During the mixing process, the powder is dispersed in the aggregate and, once the cathode has been formed and baked, the powder becomes positioned essentially in a carbon matrix between the $TiB_2$ particles.

In operation, liquid aluminum wets the cathode and penetrates the cathode via open pores to depths ranging from 0.5 to 1 mm. During penetration, the aluminum reacts with $TiO_2$—$B_2O_3$ to form, at 970° C., $TiB_2$ and $Al_2O_3$ as described by equation 1 below:

$$3TiO_2(s) + 3B_2O_3(l) + 10Al(l) = 3TiB_2(s) + 5Al_2O_3(s)$$
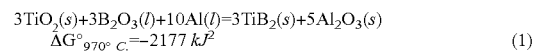
$$\Delta G°_{970° C.} = -2177 \, kJ^2 \quad (1)$$

The formation of a relatively stable solid phase of $Al_2O_3$ in the presence of aluminum favours the sealing of open pores in the cathode and improves the performance of the cathode by stabilizing the carbon matrix around initial $TiB_2$ particles. This reduces the rate at which $TiB_2$ particles leach out of the cathode.

Products formed by other suitable combinations and molten aluminum are given in Table 1. These products also form a dense phase on the cathode surface:

TABLE 1

| Additive Combination | Reaction Product with Molten Aluminum |
|---|---|
| TiC and $B_2O_3$ | $Al_4C_3$, $TiB_2$, $Al_2O_3$, AlTi, $Al_3Ti$ or $Ti_3Al$ |
| $Al_2O_3$ and $B_2O_3$ | $(Al_2O_3)_2(B_2O_3)$ |
| $TiO_2$ and $Na_2B_4O_7$ | $TiB_2$, alumina with Na in solid solution |
| BN and $B_2O_3$ | AlN, $Al_2O_3$ |
| Al—C—Ti master alloy and $B_2O_3$ | TiC, AlTi intermetallics, $Tib_2$, $Al_4C_3$ |
| $TiO_2$ and BN | $TiB_2$, AlN, $Al_2O_3$ |
| $TiO_2$ and $B_4C$ | $TiB_2$, $Al_2O_3$, $Al_4C_3$ |

EXAMPLE 1

Cathode blocks were prepared combining 33 wt % anthracite, 17 wt % pitch and 45 wt % $TiB_2$ to form an aggregate mixture. To this was added 5 wt % of the $TiO_2$—$B_2O_3$ additive mixture in the form of a fine powder containing 30%-74 µm particles. The pre-mixed additive was mixed with the aggregate at a temperature of about 160° C. for about 45 minutes to form a hot paste.

The hot paste was then transferred to a mould fixed on a vibrating table. The vibrated block was baked at about 1100° C. for about 2 hours.

Cathode blocks prepared in the above manner were subject to laboratory electrolysis testing for 65 hours. The results showed complete wetting of the cathode, along with a significant reduction in the removal of $TiB_2$ particles.

Figure 3:
FIG. 3 is a micrograph illustrating a traditional cathode block, having no additives and showing leached $TiB_2$ particles in the molten aluminum layer.
Figure 4:
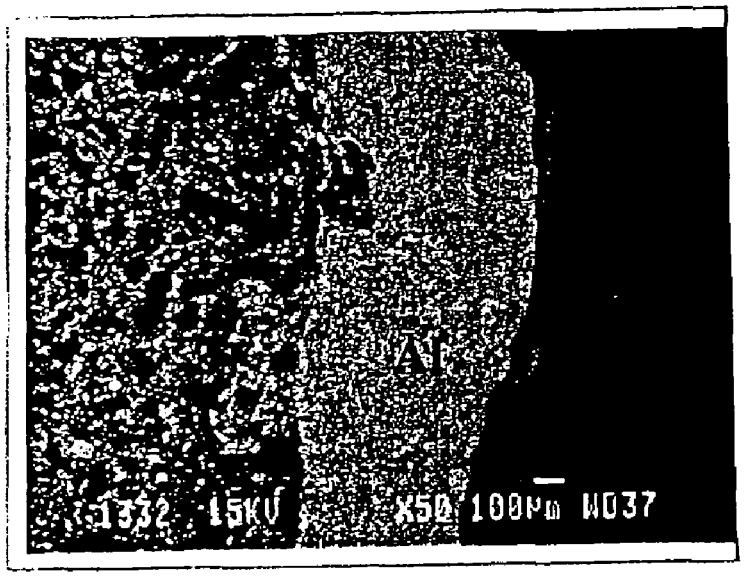
FIG. 4 is a micrograph illustrating a cathode block comprising additives of the present invention and showing no $TiB_2$ in the molten aluminum.

FIGS. 3 and 4 show loss of $TiB_2$ particles after electrolysis for cathode blocks in which no stabilizing agents were added, (FIG. 3) and for the cathode blocks of Example 1 (FIG. 4). FIG. 3 clearly shows that $TiB_2$ particles have leached out of the cathode and into the aluminum film. These particles are not present in the aluminum film of FIG. 4.

Use of the present invention is not limited to production of cathode blocks. The additive mixtures can also be used in producing ramming pastes, side wall blocks and in refractory coatings such as those disclosed in International Publication No. WO 01/61077, incorporated herein by reference. In the case of metal boride-containing ramming pastes, the additive mixture can be added to the paste aggregate, which usually also comprises anthracite, pitch, calcined coke or anode butts, and light oil diluents.

The invention claimed is:

1. A method of making an aluminum reduction cell component having a stabilized surface that is wettable by molten aluminum, which comprises mixing together a carbonaceous material, $TiB_2$ and up to 25% by weight of an additive consisting of an intimate mixture of $TiO_2$ and $B_2O_3$ and baking the mixture into a cell component having a baked surface provided with pores, wherein said $TiB_2$ is used in an amount sufficient to make the baked surface wettable by molten aluminium, and wherein at least one of said $TiO_2$ and $B_2O_3$ has a higher melting temperature than the baking temperature, whereby when the cell component is contacted with molten aluminum, the aluminium wets the baked surface, penetrates the pores therein, and reacts with the additive to form a dense phase having low solubility in aluminium that seals the pores.

2. A method according to claim 1 wherein up to 10% by weight of the additive is mixed with the carbonaceous material and $TiB_2$.

3. A method according to claim 2 wherein the carbonaceous material and $TiB_2$ are mixed in the ratio of 50% by weight of carbonaceous material and 40 to 49% of $TiB_2$.

4. A method according to claim 1 wherein the $TiO_2$ and $B_2O_3$ are mixed in a ratio of 40-50% by weight $TiO_2$ and 50-60% by weight $B_2O_3$.

5. A method according to claim 1 wherein the $TiO_2$, and $B_2O_3$ comprise particles less than 200 µm in size.

6. A method according to claim 5 wherein the particles are less than 30 µm in size.

7. A method according to claim 1, wherein 40% by weight or more of said $TiB_2$ is mixed with the carbonaceous material.

* * * * *